US010606260B2

(12) United States Patent
Seiler et al.

(10) Patent No.: US 10,606,260 B2
(45) Date of Patent: Mar. 31, 2020

(54) OCULAR NAVIGATION OF UNMANNED AERIAL VEHICLE

(71) Applicant: Intel IP Corporation, Santa Clara, CA (US)

(72) Inventors: Thomas Seiler, Puchheim (DE); Daniel Pohl, Puchheim (DE); Stefan Menzel, Stockdorf (DE)

(73) Assignee: INTEL IP CORPORATION, Santa Clara, CA (US)

( * ) Notice: Subject to any disclaimer, the term of this patent is extended or adjusted under 35 U.S.C. 154(b) by 1 day.

(21) Appl. No.: 15/716,594

(22) Filed: Sep. 27, 2017

(65) Prior Publication Data

US 2019/0094854 A1 Mar. 28, 2019

(51) Int. Cl.
*G05D 1/00* (2006.01)
*G06F 3/01* (2006.01)
*B64C 39/02* (2006.01)

(52) U.S. Cl.
CPC ......... *G05D 1/0038* (2013.01); *G05D 1/0016* (2013.01); *G06F 3/013* (2013.01); *B64C 39/024* (2013.01); *B64C 2201/146* (2013.01)

(58) Field of Classification Search
CPC ............................. G05D 1/0038; G06F 3/013
See application file for complete search history.

(56) References Cited

U.S. PATENT DOCUMENTS

| 9,164,506 B1* | 10/2015 | Zang | G05D 1/0038 |
| 2013/0307771 A1* | 11/2013 | Parker | G06F 3/013 |
| | | | 345/158 |
| 2014/0309864 A1* | 10/2014 | Ricci | H04W 4/21 |
| | | | 701/36 |
| 2018/0196511 A1* | 7/2018 | Chae | G06F 3/013 |

FOREIGN PATENT DOCUMENTS

WO WO-2017104869 A1 * 6/2017 ............ G06F 3/013

OTHER PUBLICATIONS

Kim et al., 2014: "Quadcopter flight control using a low-cost hybrid interface with EEG-based classification and eye tracking". Computers in Biology and Medicine, 2014, pp. 82-92, vol. 51, Elsevier Ltd.*
Byung Hyung Kim et al.: "Quadcopter flight control using a low-cost hybrid interface with EEG-based classification and eye tracking". In: Computers in Biology and Medicine, 2014, pp. 82-92, vol. 51, Elsevier Ltd.

* cited by examiner

*Primary Examiner* — Jonathan R Messmore
(74) *Attorney, Agent, or Firm* — Viering, Jentschura & Partner MBB

(57) ABSTRACT

Herein is disclosed an unmanned aerial vehicle navigation system including one or more cameras configured to detect user image data; and one or more processors configured to determine from the user image data a user eye orientation; select according to a selection criterion a navigation behavior based on the user eye orientation; and determine a navigation instruction to cause the unmanned aerial vehicle to travel in accordance with the navigation behavior.

20 Claims, 9 Drawing Sheets

OCULAR NAVIGATION OF UNMANNED AERIAL VEHICLE

TECHNICAL FIELD

Various embodiments relate generally to the navigation of an unmanned aerial vehicle ("UAV") using eye position or gaze.

BACKGROUND

As UAVs become more common, the tasks performed by UAVs have assumed a greater diversity and complexity. UAV tasks may require both mastery of UAV piloting skills, as well as specifics for UAV tasks, whether image gathering, object manipulation, or otherwise. Furthermore, and given the ever-increasing integration of UAVs into daily life, the person selected as a UAV pilot may be selected because of expertise in an unrelated task, yet having comparatively little UAV piloting experience. The demands of UAV piloting may tax pilot resources and complicate the completion of other non-piloting tasks.

SUMMARY

An unmanned aerial vehicle navigation system for ocular flight control of an unmanned aerial vehicle is disclosed herein, the navigation system including one or more cameras which are configured to detect user image data; and one or more processors configured to determine from the user image data a user eye orientation; to select according to a selection criterion a navigation behavior based on the user eye orientation; and determine a navigation instruction to cause the unmanned aerial vehicle to travel in accordance with the navigation behavior.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
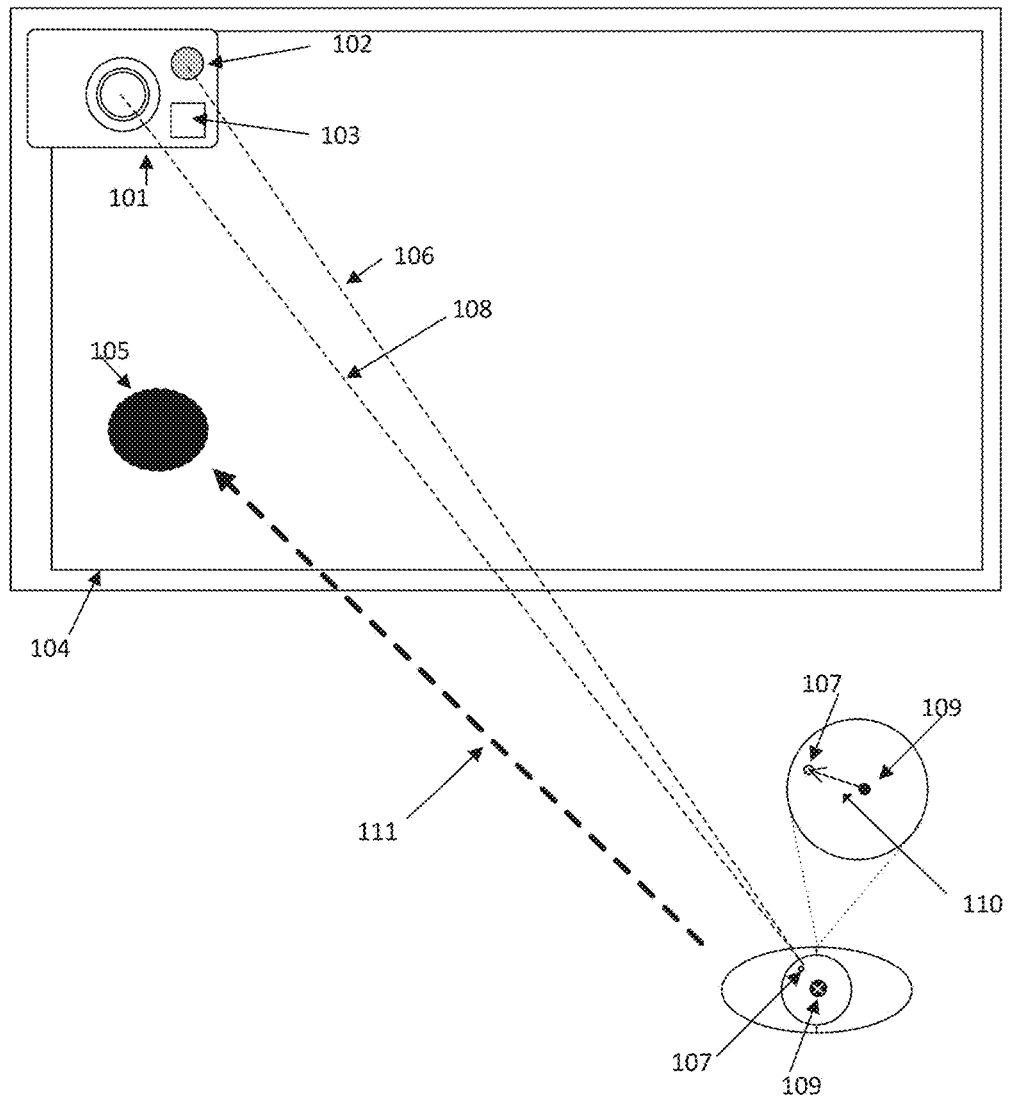
FIG. 1 shows concepts of an eye tracking technology.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Because the UAV navigation device and related method described herein relies in part on eye tracking technology, the following includes a brief overview of an eye tracking technology suitable for use with the navigation system disclosed herein. A person skilled in the art will readily appreciate a current diversity in eye tracking technologies and the likelihood that future implementations of eye tracking technologies may differ further still. Nothing in the following description of eye tracking technology is intended to be limiting. Rather, one possible configuration of eye tracking technology is described herein, at least to provide additional context to the UAV navigation system. It is expressly contemplated that alternative eye tracking configurations, even those which use partially or completely different components, may be utilized in the following navigation system.

FIG. 1 depicts general concepts of an eye tracking technology. The eye tracking technology includes a camera 101, a projector 102, and one or more processors 103. The camera 101 and the projector 102 may be mounted in a fixed relationship to a display 104. A user views an image or video on the display 104, and the user's vision is directed toward an area of attention 105 on the screen. The projector 102 projects light 106 onto one or more of the user's eyes to create a recognizable pattern or image, which is reflected away from the eye in a corneal reflection 107. The light from the corneal reflection 107 travels toward the camera 101 as shown in 108. The camera 101 receives an image of the eye, which includes at least the corneal reflection 107 and the iris 109. The one or more processors 103 identify a center point of the iris 109 and the corneal reflection 107. The one or more processors 103 determine a vector 110 based on the center of the iris 109 to the corneal reflection 107. Assuming no head movement, the corneal reflection 107 is principally static, given that it is created by a fixed projector 102. The iris 109 is principally dynamic and will change location along with ocular movement. Being a product of the principally static corneal reflection 107 and the dynamic iris 109, the vector 110 allows calculation of the iris relative to a fixed point, and therefore calculation of an eye orientation. The calculated eye orientation can be mapped to the display 104 to determine an area of attention 105. Where an eye tracking system includes a headmounted display, the relevance of head movement with respect to eye tracking is minimized. Where the display is not headmounted, and where the head is permitted to move irrespective of the display, a person skilled in the art will recognize the need to account for head movement, and the methods available therefore.

It is recognized that many variations of eye tracking technology exist, including eye tracking systems with a projector in a coaxial optical path, a projector in a non-coaxial optical path, and systems that omit a projector, as well as additional variations. The UAV navigation device and method therefor disclosed herein is not included to be limited to the specific eye tracking configuration described, infra. Rather, it is anticipated that a person skilled in the art may select an eye tracking configuration suitable for the navigation device and method disclosed herein, whether coaxial, non-coaxial, with or sans projector, or otherwise.

Figure 2:
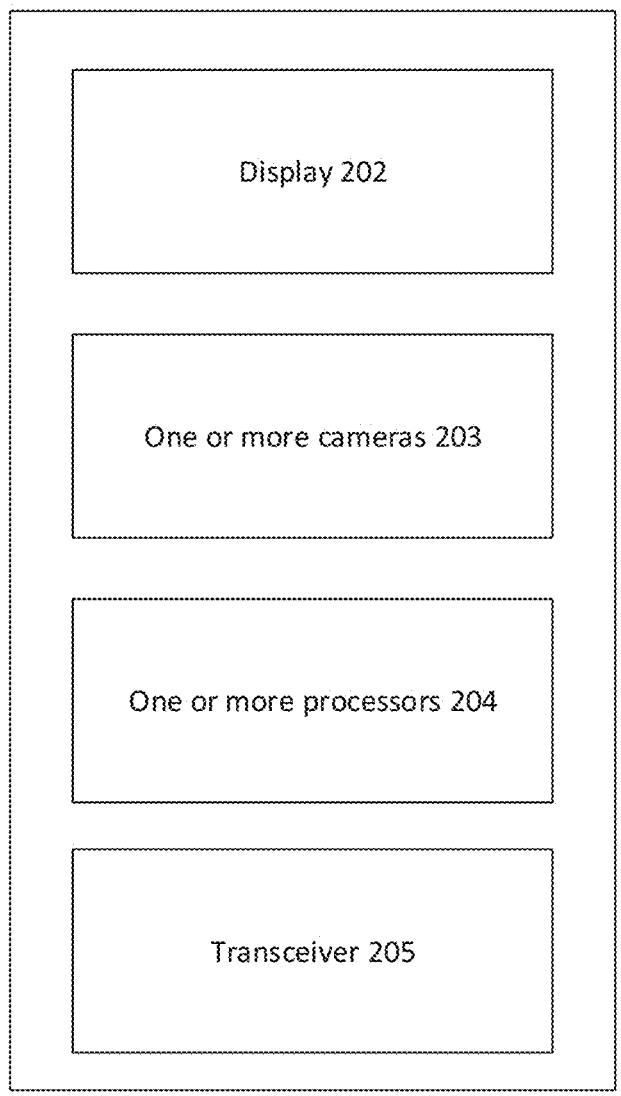
FIG. 2 shows an unmanned aerial vehicle navigation system.

FIG. 2 shows an unmanned aerial vehicle navigation system 201 including one or more cameras 203 configured to detect user image data; and one or more processors 204 configured to determine from the user image data a user eye orientation; select according to a selection criterion a navigation behavior based on the user eye orientation; and determine a navigation instruction to cause the unmanned aerial vehicle to travel in accordance with the navigation behavior. The unmanned aerial vehicle navigation system may also include an optional display 202, configured to display image data received from the unmanned aerial vehicle, wherein the one or more processors map the user eye orientation to a region of the display. The unmanned aerial vehicle navigation system may also further include an optional transceiver 205 configured to transmit the navigation instruction to an unmanned aerial vehicle.

Figure 3A:
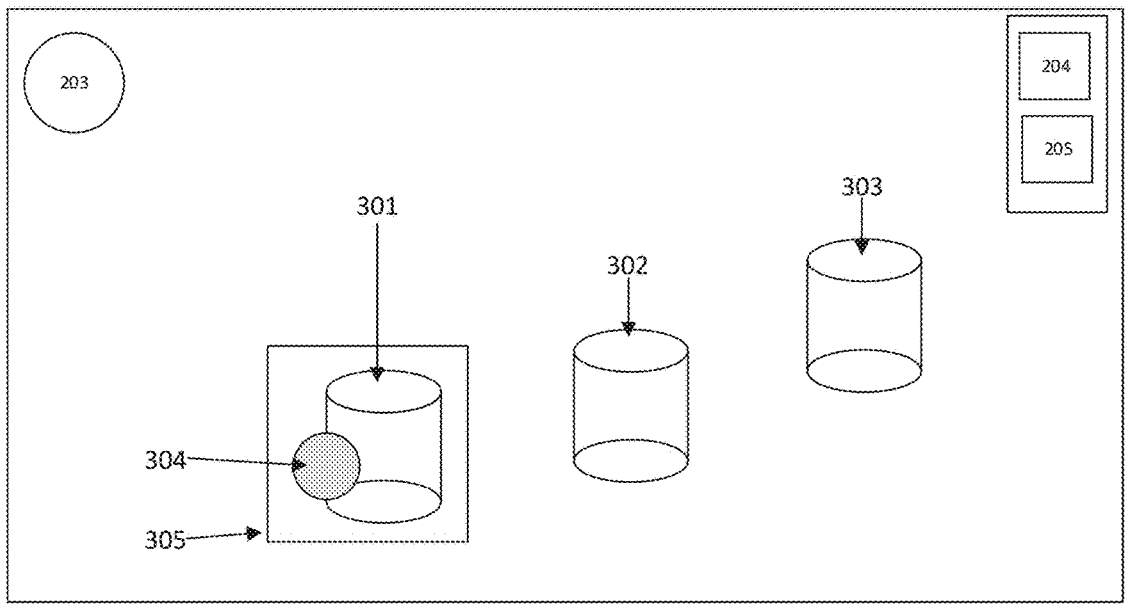
FIG. 3a shows an eye tracking device for selection of a navigation destination.

FIG. 3a shows an eye tracking device for UAV navigation configured to select a navigation destination based on a region of sustained user attention. User display 202 includes one or more cameras 203, one or more processors 204, and a transceiver 205. In this example, the display 202 depicts three objects 301, 302, and 303, against a nonspecific background. Although this is a simplified version, this arrangement is similar to a UAV's aerial view of a beach, field, or parking lot, wherein a limited number of individual objects may be present. In this case, an eye tracking procedure is performed, which reveals that the user's attention is directed to the first object 301. Specifically, the region of attention 304 corresponds with a portion or wall of 301. The navigation system disclosed herein recognizes 301 as an object to which the user's attention is directed, and the object is selected, as is depicted by 305. A timer is initiated, during which a predetermined duration is counted. If the user's attention remains on object 301 throughout the predetermined duration, object 301 will become a navigation destination. Alternatively, upon directing the user's attention to 301, the user may manually select 301 with an external selection device, such as a button, pedal, or other means of input.

Figure 3B:
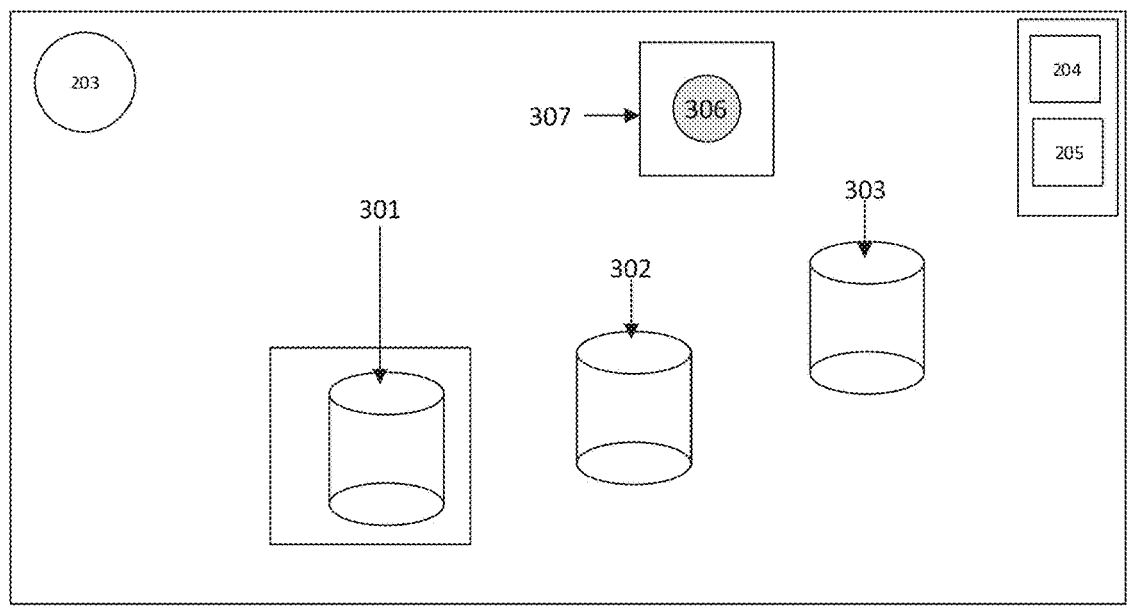
FIG. 3b shows an eye tracking device for selection of a navigation destination.

FIG. 3b shows an eye tracking device for selection of a navigation destination based on a region of sustained user attention. User display 202 includes one or more cameras 203, one or more processors 204, and a transceiver 205. In this case, and in contrast to FIG. 3a, the user attention is not directed to a specific object, but rather to a region of the display 306 where no object is shown. In this case, the navigational system does not select an object as a navigation destination, but rather chooses a navigational direction. This may occur, for example, where user directs sustained attention toward an area of the horizon or sky. In this case, the user attention is not directed toward objects 301, 302, or 303, but rather toward region 306. Upon expiration of a timer of a predetermined duration, area 306 will be selected as a navigation direction, as depicted by 307. Where a region not corresponding to an object is selected as a region for a navigational direction, UAV will be instructed to travel toward the selected region 306. According to one aspect of the disclosure, the UAV may be instructed to travel toward 306 until receiving an alternative instruction. According to another aspect of the disclosure, the UAV may be instructed to travel a fixed distance in the direction of 306 and to await further instruction. The fixed distance may be determined based on an approximate distance between the UAV and the area corresponding to region 306. As in FIG. 3a, and as an alternative to a timer-based selection, the user may manually confirm the selection of 306 with an external device, such as a button, pedal, or other means of input.

Figure 4:
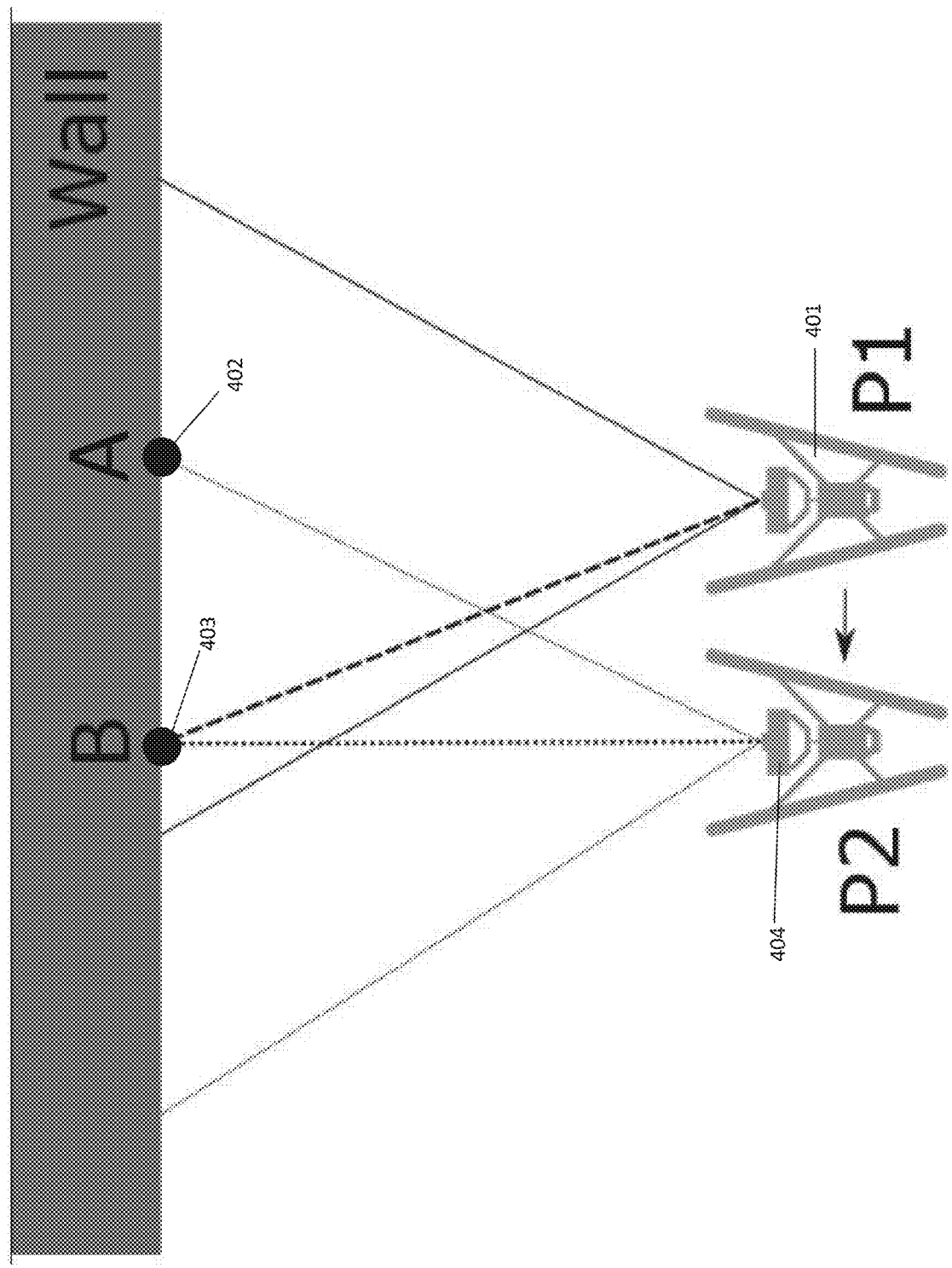
FIG. 4 shows a right angle inspection method on a planar surface.

FIG. 4 shows a right angle inspection method of a planar surface. In this figure, a UAV located at position one 401 has been instructed to inspect Point A 402 on a wall. This may happen where, for example, the user has directed visual attention to Point A for a duration in excess of the predetermined threshold, and therefore the UAV has received navigation instructions to navigate toward Point A 402. Point A is a portion of a wall, the external surface of which forms a vertical plane. The UAV determines a minimum safe distance from the wall and inspects Point A at a right angle to the wall, maintaining at least the minimum safe distance at all times. The front or nose portion of the UAV is directed toward Point A 402. During the course of inspection, the user may desire to inspect a different point of the wall, for example Point B 403. To select Point B 403 for inspection, the user directs the user's visual attention to Point B for a duration longer than the predetermined duration, and Point B 403 is selected as a navigational destination. Because Point B 403 is located on the same wall as Point A 402, transfer from Point A 402 to Point B 403 requires only a horizontal shift in the location of the UAV from position one 401 to position two 404. To achieve this, the UAV maintains a right angle from the surface of the wall and performs a horizontal shift corresponding to the distance between Point A 402 and Point B 403, such that the front or nose of the UAV becomes directly aligned with Point B 403. This is achieved while always maintaining at least the minimum safe distance from the wall. Although the difference between Point A 402 and Point B 403 is depicted as a horizontal difference along an x-axis, Point B could alternatively be located above or below Point A, or at any angle with respect to Point A along the surface of the wall.

Figure 5:
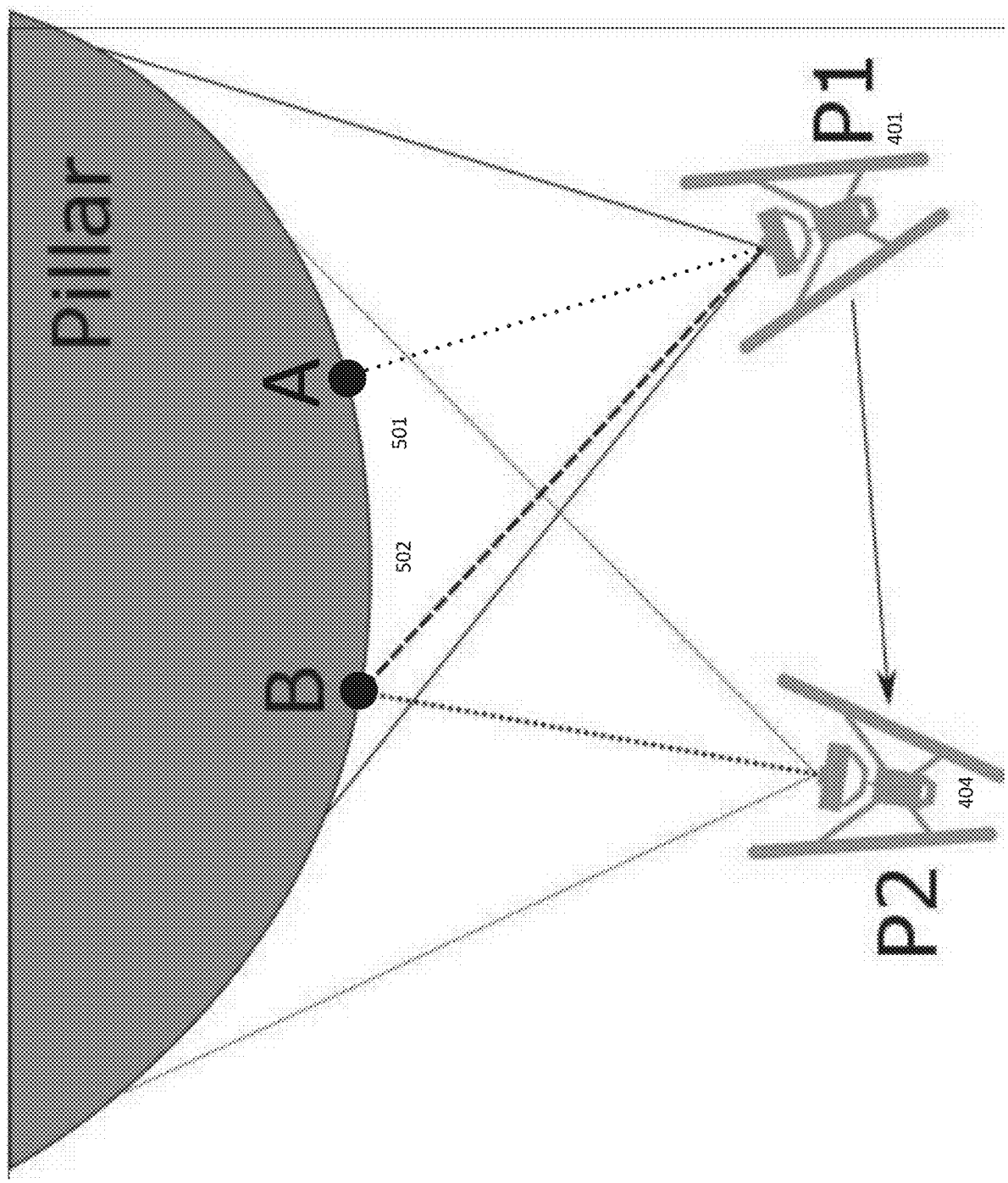
FIG. 5 a right angle inspection method on a rounded surface.

FIG. 5 shows a right angle inspection method of a rounded surface. In this figure, the object to be inspected is a pillar, and thus a rounded surface, rather than a planar surface. Point A 501 has been selected as an initial inspection point, and the UAV has traveled to position one 401 to perform the inspection. As in FIG. 4, position one 401 is at a right angle to (or is normal to) Point A 501, and the distance between position one 401 and Point A 501 is at least the minimal safe distance from the pillar. Where the user desires to switch the area of inspection from Point A 501 to Point B 502, the user may turn the user's gaze to Point B 502. Where the user's gaze is fixed at Point B 502 for a duration greater than the predetermined threshold, Point B 502 will be selected as the new inspection point. The navigation system will instruct the UAV to travel to position two 404, which is a point normal to Point B 502 and at least the minimum safe distance removed from the pillar. As can be seen in FIG. 5, and due to the curved nature of the pillar to be inspected, the distance between position one 401 and position two 404 is greater than the distance between Point A 501 and Point B 502. Transfer from position one 401 to position two 404 requires at least both a horizontal shift along an x-axis and a rotation such that the front or nose of the UAV is pointing in a direction normal to Point B 502.

Figure 6:
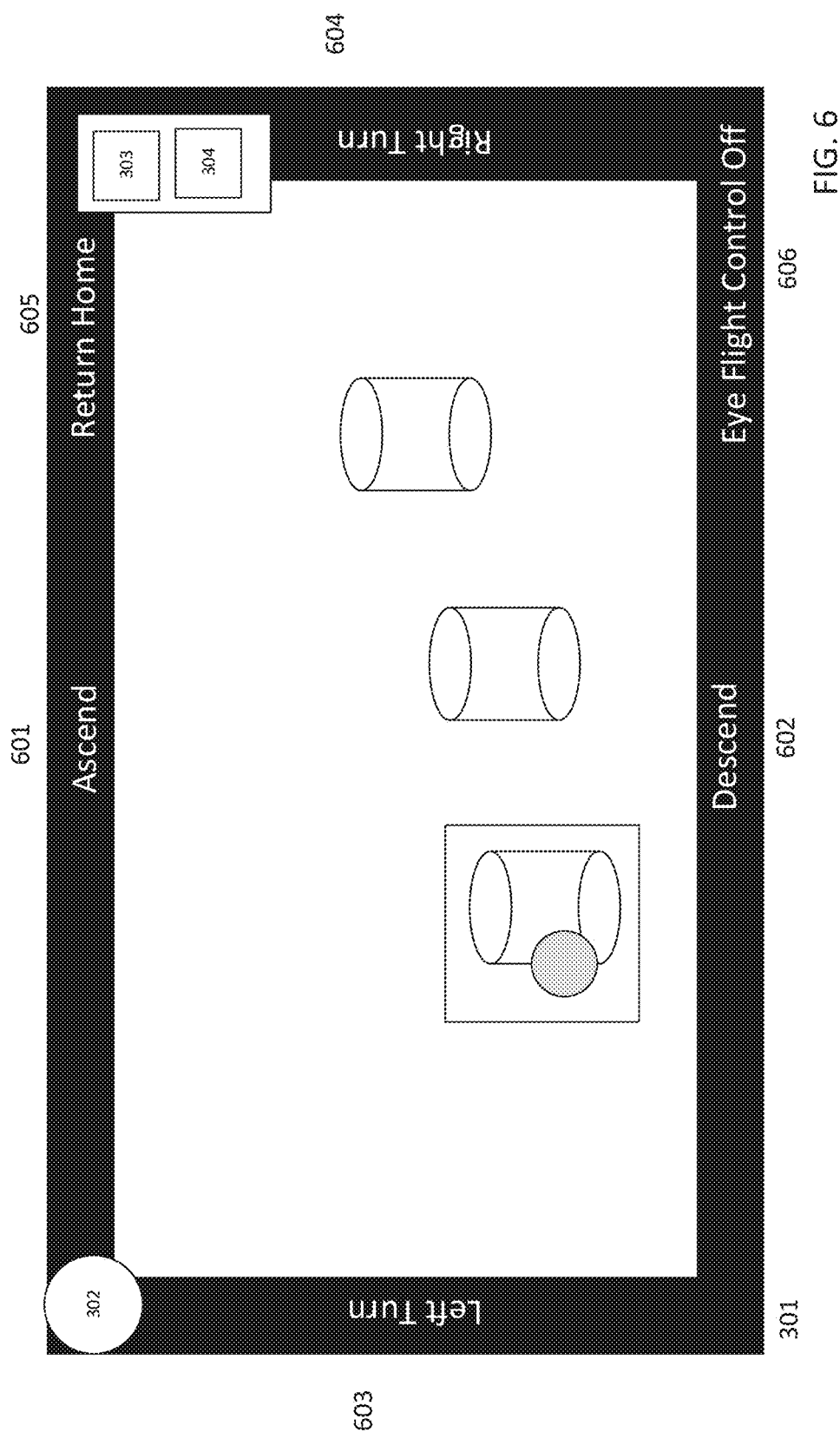
FIG. 6 shows a device for user-initiated direct input of navigation commands.

FIG. 6 shows a device for user-initiated direct input of navigation commands. The device includes a display 301, one or more cameras 302, one or more processors 303, and a transceiver 304. In this case, one or more portions of the display 301 are reserved for direct commands, which relate to navigational directions or movements of the UAV. Specifically in FIG. 6, the display 301 includes regions for commands to ascend 601, to descend 602, to turn left 603, and turn right 604. The display may be configured with a command region to return home 605, wherein the UAV will be instructed to return to its starting place or home base. The display may be configured with a command region to turn off eye tracking 606, wherein the eye tracking will be temporarily disabled. Where Eye Flight Control Off 606 is initiated, the UAV may remain stationary until otherwise instructed, such as when the drone receives non-eye-initiated instructions, or when the eye tracking commands are turned on. Where the Eye Flight Control Off 606 is initiated, the UAV may be instructed to remain stationary and transmit images from one or more directions. The Eye Flight Control Off 606 may be employed whenever a pilot's attention must be directed elsewhere, for instance, but not limited to, a telephone call, a conversation, or otherwise. Where the Eye Flight Control Off 606 is initiated, the button region on the display may change to "Eye Flight Control On," wherein the pilot may resume eye tracking with a sustained ocular attention to the button. These commands are selected by directing a user's visual attention to the region of the display with the command is shown, and to hold the user's visual attention on the area for a duration in excess of the predetermined threshold, following the same procedures used to select an object or region for navigation. Once the command is selected based on sustained user attention, the UAV will be instructed to perform the selected command until the user's attention is directed away from the region of the display corresponding to said command. For example, where the user desires the UAV to ascend, the user may direct the user's visual attention to the ascend section 601. After the user's attention is on the ascend section 601 for a duration greater than the predetermined threshold, the UAV will begin to ascend. The UAV will continue to ascend until the user's attention is directed away from the ascend region 601. Alternatively, upon directing the user's attention to a region corresponding to a navigation command, the user may manually select the command with an external selection device, such as a button, pedal, or other means of input.

The user may alternate between object-oriented navigation and command-oriented navigation simply by changing the direction of attention. Specifically, where object-oriented navigation is desired, the user may direct the user's attention to an object depicted on the display. Where command-oriented navigation is desired, the user may direct the user's attention to a navigation command region depicted on the display.

Figure 7:
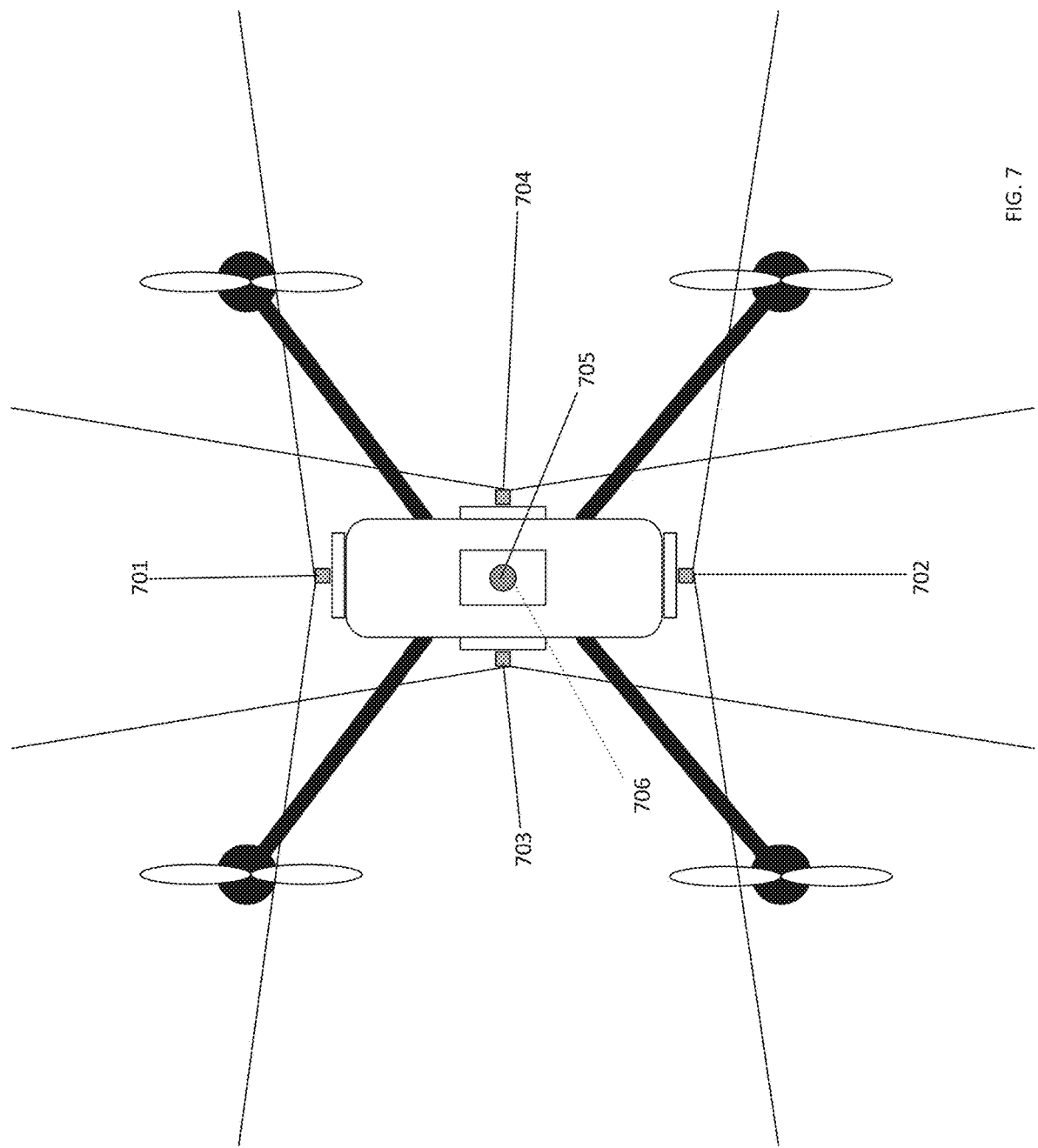
FIG. 7 shows a UAV configured with one or more image sensors.

FIG. 7 shows a UAV configured with one or more image sensors to provide an image data feed for the navigational device disclosed herein. In FIG. 7, the UAV is equipped with a plurality of image sensors 701, 702, 703, 704, 705, and 706 to provide a 360 degree view surrounding the UAV. The images sensors may be cameras, including still cameras or video cameras. The UAV may be equipped with fewer or more image sensors than depicted herein, as selected for an implementation.

Figure 8:
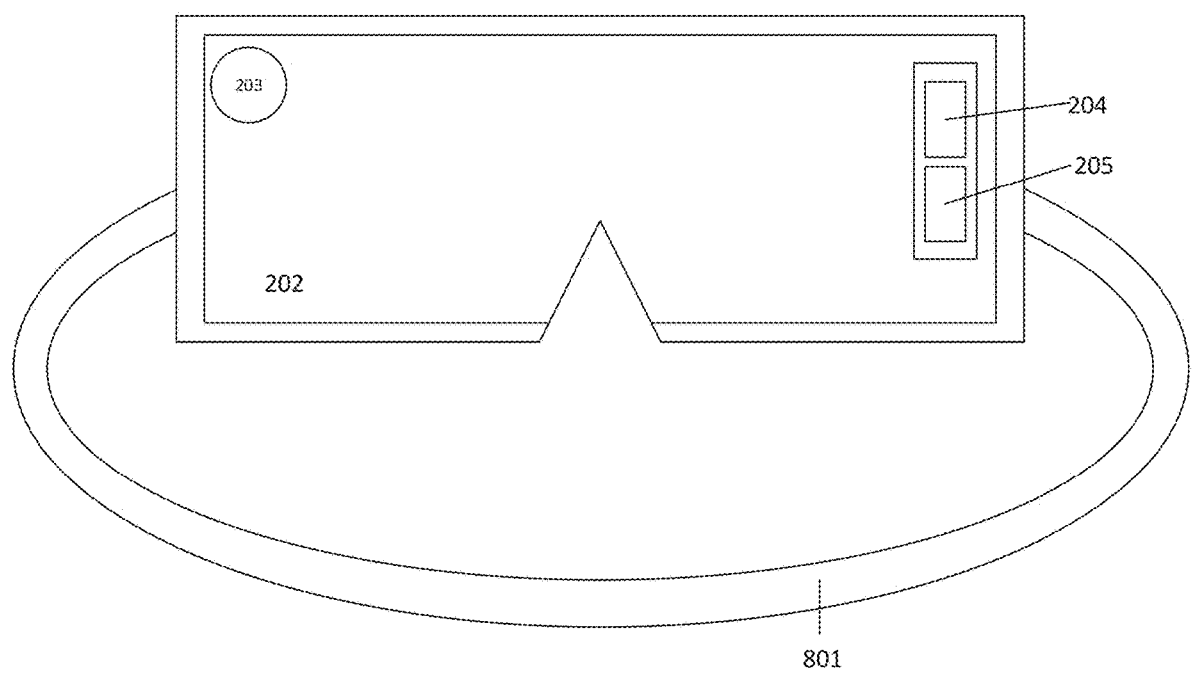
FIG. 8 an unmanned aerial vehicle navigation system as a headmounted display.

FIG. 8 shows the unmanned aerial vehicle navigation system of FIG. 8 arranged as a headmounted display. Headmounted displays may be designed in a variety of configurations, and any headmounted display as disclosed herein should not be limited to the specific configuration as depicted in FIG. 8. A headmounted display according to this disclosure includes at least a display 202, one or more cameras 203, one or more processors 204, and a transceiver 205. It is further anticipated that the headmounted display will include an affixation device 801 to affix the headmounted display to the user's head. This may be, without limitation, a helmet, a strap, a brace, a sleeve, a suit, or otherwise. A headmounted display may result in a fixed relationship between a user's eyes and the navigation system, which may simplify eye tracking by eliminating a variable of head and eye location with respect to the navigation system.

Figure 9:
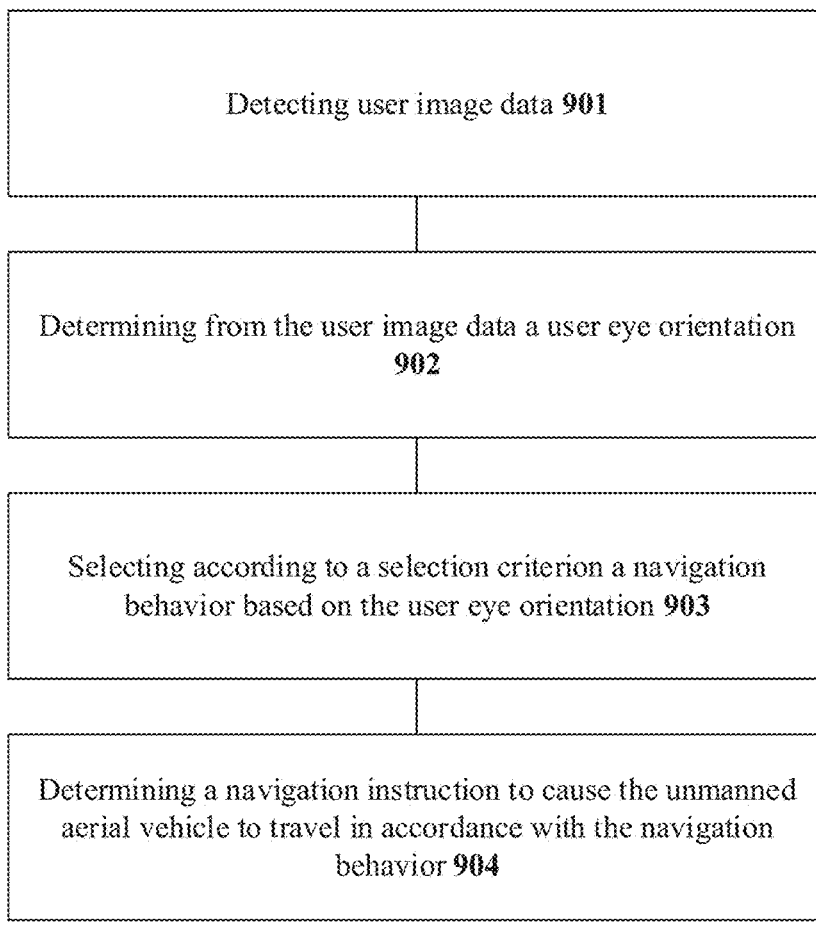
FIG. 9 shows a method of navigating an unmanned aerial vehicle.

FIG. 9 shows a method of navigating an unmanned aerial vehicle including detecting user image data 901; determining from the user image data a user eye orientation 902; selecting according to a selection criterion a navigation behavior based on the user eye orientation 903; and determining a navigation instruction to cause the unmanned aerial vehicle to travel in accordance with the navigation behavior 904.

Eye Tracking, Generally

Eye tracking is a procedure for measuring rotation or movements in the eye, which is then used to determine a point of gaze. The method of eye tracking used herein may be known as optical tracking. Optical tracking uses a non-contact, optical-based method for measuring the movement of one or more eyes. Optical tracking analyzes light that is reflected from an eye to an optical sensor, including, but not limited to a video camera. The reflected light may be infrared light, which may minimize distraction due to infrared light's invisibility to a human subject, although the procedures discussed herein may work with any light frequency.

The eye reflection may be a corneal reflection, meaning that light is projected onto the eye and reflected from the corneal region. This reflected portion or portions of the cornea are used in conjunction with the center of the pupil to track a location, direction, or movement of the eye.

Optical tracking may require identification of the pupil, and/or determination of the pupil's center. The pupil may be identified using a light saturation technique, where in an illumination is coaxial with an optical path (sometimes referred to as the bright pupil technique). Alternatively, the pupil may be identified using an illumination device that is offset from the optical path, (sometimes referred to as the dark pupil technique). Regardless of the pupil identification method used, one or more processors analyze an image depicting a pupil and a corneal reflection, and a vector is determined between the pupil center and the corneal reflection. From the vector, and considering a generally fixed position of the corneal reflection, an ocular orientation and corresponding area of attention can be calculated.

According to another aspect of the disclosure, it may be necessary to calibrate one or more components within the eye tracking device. Calibration may be necessary to more accurately measure an eye direction or to more accurately achieve eye tracking, due to individual differences in eye size, shape, or configuration.

According to another aspect of the disclosure, the eye tracking equipment may be integrated into a headmounted display. Such a headmounted display is affixed to the head and moves in accordance with head movements. Using the determined eye direction, and taking into account a distance and relationship between the eye and the display, it can be determined where the user's visual attention is directed.

According to another aspect of the disclosure, the eye tracking equipment may be mounted to a non-headmounted display. Unlike with a headmounted display, a non-head-mounted display will typically not move in accordance with changes to a user's head position. As such, eye tracking may additionally require consideration of an eye's locational movement relative to a display, the eye's locational movement being dictated by head movement and/or position. The locational movement may be assessed using camera image data and corresponding pupil identification.

Although a detailed description of eye tracking is given herein, eye tracking technology is subject to various implementations and is expected to change. Nothing in this description should be understood as limiting eye tracking technology to a particular implementation or current state of development, but rather the navigational controls described herein rely on a present or future implementation of eye tracking technology to discern the subject of a user's attention on a display.

Navigation from Eye Tracking, Object

According to one aspect of the disclosure, UAV navigation may be object-oriented. According to the object-oriented navigation method, user gaze is tracked to a display image, the display image including at least one live feed from an unmanned aerial vehicle. Using this configuration, a user sees a region in the vicinity of the unmanned aerial vehicle, from the UAV perspective. As the user's gaze is tracked, the tract gauge is mapped to a display to ascertain the area of the user's visual attention. Image recognition technology is further carried out to ascertain whether the user's gaze is directed to a specific object, or merely to space or horizon. For example, where a barrel is present on an otherwise empty beach, the digital feed is analyzed to determine whether the user's gaze is directed toward the barrel, the sandy beach, the sky, or otherwise. When the user's gaze is directed toward a specific object, such as the barrel in this example, a timer is initiated to determine the length of attention toward the object. Where the attention exceeds a predetermined threshold, the object is selected as a navigational destination. According to one aspect of the disclosure, the predetermined threshold is 1 to 2 seconds. The predetermined threshold may be any length of time as program for a given implementation. According to another aspect of the disclosure, the predetermined threshold may be a user-determined or user-modified period.

The timer function described herein may be performed by the one or more processors. Where this occurs, the timer may be a processors calculation, a processor clock, or a non-transferable machine readable instruction to cause the one or more processors to perform a timing function. Alternatively, the timer may be separate timing device.

A navigational destination is an area to which the UAV is directed to navigate. In the previous example, where the barrel is selected as a navigational destination based on exceeding a predetermined threshold of attention toward the barrel, the UAV is instructed to travel toward the barrel. The path of travel may be selected by one or more navigational factors. Said navigational factors may include, but are not limited to, the most direct flight path to the navigational destination; obstacles or hazards within, or in the vicinity of, the most direct flight path to the navigational destination; and any direct navigational input from the user.

Navigation from Eye Tracking, Direction

According to another aspect of the disclosure, UAV navigation may be achieved through directional gaze input. According to the directional gaze input method, the user gaze is not tracked to an object, but rather to a region or vicinity of the display feed. Using the previous example of a barrel on a beach, and where the user's gaze is directed to a portion of the horizon rather than to a specific object, such as the barrel, the region of the horizon to which the user's attention is directed may be chosen as a navigational destination. That is, the UAV will receive a navigational instruction to travel toward the region of the horizon to which the user's gaze is directed. According to one aspect of the disclosure, the region of the user's gaze may be identified as a navigational destination upon the user's gaze exceeding a predetermined threshold. According to one aspect of the disclosure, the predetermined threshold may be 1 to 2 seconds. The predetermined threshold may be any length of time as program for a given implementation. According to another aspect of the disclosure, the predetermined threshold may be a user-determined or user-modified period.

The UAV may be equipped with a 360° camera, which may provide a view on the user display at or approaching 360° of vision from the UAV's perspective. Where the user display is capable of a 360° view, such as a round or domed display, for example a series of displays in multiple directions, the UAV feed may be displayed accordingly to provide a 360°, or near 360°, view. The pilot's gaze may be tracked at any point in the 360° view, regardless of direction or display to which the gaze is directed. According to one aspect of the disclosure, the image data may be displayed in a 360°×180° degree environment, whether by rounded screen or screens, rounded projection or projections, or otherwise.

Where a 360° camera is used, but the pilot's display is not equipped for displaying 360° of video feed, a video feed and one or more general directions may be selected, with the ability to change camera perspective based on user gaze input. For example, the user display may show a forward view of the UAV, such as the direction in which the UAV is traveling. The user display may be equipped with one or more regions or buttons displaying miniaturized versions of the UAV video feed from other directions, such as aft, port, or starboard directions. To view said direction, the pilot may direct the pilot's gaze to one of the miniaturized feeds or buttons, and where the gaze exceeds a predetermined threshold, the selected perspective will be displayed as the primary perspective on the pilot's user display.

By directing user gaze to an object or region of the display, and particularly where the object or region is not within the UAV's current flight path, the UAV may receive instructions to alter the flightpath including, but not limited to, curving, turning, rotating, increasing elevation, decreasing elevation, increasing speed, or decreasing speed.

Where a 360° camera is present, and the user is equipped with a headmounted display, the navigational device may be configured such that a change in the user's head direction causes a change in the visual display shown to the user. That is, a left turn of the user's head causes the user display to depict a region on the left or port side of the UAV. Similarly, a right turn of the user's head causes the user display to depict a region on the right or starboard side of the UAV.

The UAV may be directly controlled by directing user gaze toward display areas corresponding to specific navigational instructions. One or more portions of the user display may be reserved for displaying one or more navigation commands in addition to the video feed. Such commands may include, but are not limited to commands instructing the UAV to ascend, to descend, to turn left, to turn right, to increase speed, to decrease speed, to rotate left, to rotate right, to land, or to become airborne. These commands may be displayed on any region or regions of the user display, including, but not limited to around an external circumference of the display feed, or as buttons within the display feed.

The UAV is configured for collision detection. Using the collision detection technology, UAV will determine a minimum safe distance from a navigational destination and will approach the navigational destination up to, but not exceeding, the minimum safe distance.

Where an object has been selected as a navigational destination, the UAV will approach the navigational object and, after reaching a desired distance from the object up to, but not exceeding, the minimal safe distance, the UAV will maintain a perpendicular angle to the object. For example, where the object-oriented navigational destination is a column with a primarily longitudinal vertical access, the UAV will position itself at a right angle to the column and may navigate around the column while maintaining the right angle and at least the minimum safe distance. This may be particularly useful for inspections, where an object such as a column, pillar, or otherwise may be inspected by causing the drone to encircle or otherwise orbit around the structure. According to another aspect of the disclosure, and where the object-oriented navigational destination includes a planar surface, rather than a rounded surface, the UAV may encircle the object at an angle perpendicular to the planar surface. Alternatively, the UAV may sweep from side to side relative to the planar surface, maintaining a perpendicular angle and at least a minimum safe distance.

Inspection of an object-oriented surface may be further controlled using user gaze. That is, once an object is selected as a navigational destination, and upon approaching the object and reaching the desired perpendicular angle for inspection, the UAV may be directed to travel relative to the object based on user gaze input. For example, where the object is a column, a gaze toward the left portion of the column (as viewed on the user display) may cause the UAV to travel in a clockwise direction around the column. Similarly, a gaze toward the right portion of the column may cause the UAV to travel in a counterclockwise direction around the column. Additionally, where the object is a planar surface, such as the side of the building, a gaze toward a left region of the planar surface may cause the UAV to travel toward the left region of the planar surface, and a gaze toward the right region of the planar surface may cause the UAV to travel toward the right region. It is anticipated that this travel will be achieved maintaining the right angle to the planar surface and at least the minimum safe distance.

Rotational buttons or regions may be added to the user display to cause the UAV to travel around an object for inspection. For example, where a UAV is inspecting a column or pillar, the user display may be equipped with rotational buttons, such as "rotate left" or "rotate right," whereby directing the user gaze toward one of the buttons causes the UAV to rotate in the corresponding direction around the object.

The navigation device receives a video feed from the UAV. The video feed is received by one or more UAV sensors. The UAV sensors may be image sensors, such as one or more video cameras. Said one or more video cameras may use a conventional visible light spectrum, an infrared spectrum, a thermal spectrum, or any other light spectrum capable of being used to render video images. Said one or more video cameras may use any combination of the above light spectrums. Said cameras may be mono cameras or stereo cameras, such as a depth-sensing camera. Where multiple mono cameras are employed, overlapping regions of two or more mono cameras may be used to ascertain depth within the image.

The navigation system may utilize the eye tracking system to assess a user's attention. That is, eye tracking results may be assessed for consistent attention to flight or inspection tasks, or for indications related to distraction away from said tasks. This may include, for example, eye attention to a region not corresponding with the display. Where an assessed level of distraction rises above a predetermined threshold, attention redirecting measures may be employed. Attention redirecting measures may include, but are not limited to, displaying warnings on the user display, causing objects or regions to blink or flash, causing a visual change in the display such as a change in color or intensity, or providing an audio signal.

Gaze-controlled UAV navigation shifts the navigational burden from the pilot's hands to the pilot's eye. With the hands relieved of navigational duty, the pilot's hands become free for non-navigational controls, such as inspection controls, manipulation controls, photographing controls, video controls, etc. The elimination of hand-controlled navigation may simplify piloting activities and reduce necessary training time and cost associated with UAV pilot training.

The pilot may be equipped with additional hand controls to supplement the gaze-based navigational instructions. Such hand based controls may be configured to alter a minimum safe distance from the navigational object, to alter an inspection distance from the navigational object, or to cause immediate movement or suspension of movement in the UAV, without the need to wait for satisfaction of a predetermined threshold. Without limitation, these additional controls may include one or more buttons, one or more wheels, and/or one or more foot pedals.

The navigational controls and UAV display may be communicated between a pilot in the UAV over the Internet. Because the data between the pilot in UAV includes primarily a video feed in a series of navigational controls, these data are well-suited for Internet transmission. The ability to transmit these data over the Internet allows for remote UAV control without regard to distance.

Similarly, the video feed and navigational controls described herein may be transmitted via a wireless radio access technology. Whether through the Internet or a wireless radio access technology, the transmission method allows for remote control and operation of the UAV without respect to distance her geographic removal. This may permit selection of qualified pilots without respect to distance from drone operation. The simplified piloting procedures described herein may allow for pilot selection based on expertise in a non-piloting drone task, said selection being performed without the need to consider geographic with relation to the UAV.

The simplified navigational procedures described herein may be advantageous by making possible UAV control to persons with disabilities. Given the historical and-based navigational controls, persons with absent or disabled upper extremities have endured limitations in their abilities to pilot a UAV. The gaze-based navigational methods described herein may permit increased or full piloting ability for those persons with upper extremity disabilities, for home UAV piloting may have been limited or impossible.

The following examples pertain to various aspects of the disclosure as described herein:

In Example 1, an unmanned aerial vehicle navigation system is disclosed comprising: one or more cameras configured to detect user image data; and one or more processors configured to determine from the user image data a user eye orientation; select according to a selection criterion a navigation behavior based on the user eye orientation; and determine a navigation instruction to cause the unmanned aerial vehicle to travel in accordance with the navigation behavior.

In Example 2, the unmanned aerial vehicle navigation system of Example 1 is disclosed, further comprising a display, configured to display image data received from the unmanned aerial vehicle is disclosed, wherein the one or more processors map the user eye orientation to a region of the display.

In Example 3, the unmanned aerial vehicle navigation system of Example 2 is disclosed, wherein the mapped display region corresponds to an object; the navigation behavior is navigation toward the object; and the navigation instruction is selected based on a relationship between a location of the unmanned aerial vehicle and the object.

In Example 4, the unmanned aerial vehicle navigation system of Example 2 is disclosed, wherein the mapped display region corresponds to a navigational direction; the navigation behavior is navigation in the navigational direction; and a navigation instruction is selected based on a relationship between a location of the unmanned aerial vehicle and the navigational direction.

In Example 5, the unmanned aerial vehicle navigation system of any one of Examples 1 to 4 is disclosed, wherein the selection criterion is a sustained user eye orientation toward an object for at least a predetermined duration.

In Example 6, the unmanned aerial vehicle navigation system of any one of Examples 1 to 4 is disclosed, wherein the selection criterion is a sustained user eye orientation toward a location for at least a predetermined duration.

In Example 7, the unmanned aerial vehicle navigation system of any one of Examples 1 to 4 is disclosed, wherein the selection criterion is a sustained eye orientation toward a display region for at least a predetermined duration.

In Example 8, the unmanned aerial vehicle navigation system of any one of Examples 1 to 4 is disclosed, wherein the selection criterion is a non-ocular election of the mapped display region as an unmanned aerial vehicle destination.

In Example 9, the unmanned aerial vehicle navigation system of Example 8 is disclosed, wherein the non-ocular election is election using a button, slide, touchpad, or pedal.

In Example 10, the unmanned aerial vehicle navigation system of Example 8 is disclosed, wherein the non-ocular election is election using a hand-actuated control.

In Example 11, the unmanned aerial vehicle navigation system of Example 8 is disclosed, wherein the non-ocular election is election using a foot-actuated control.

In Example 12, the unmanned aerial vehicle navigation system of any one of Examples 1 through 11 is disclosed, wherein the one or more processors are configured to determine a user attention state using one or more mapped eye orientations.

In Example 13, the unmanned aerial vehicle navigation system of Example 12 is disclosed, wherein the one or more processors are configured to display a visual attention cue.

In Example 14, the unmanned aerial vehicle navigation system of Example 12 is disclosed, wherein the one or more processors are configured to play an audio attention cue.

In Example 15, the unmanned aerial vehicle navigation system of any one of Examples 1 through 14 is disclosed, wherein the mapped display region corresponds to a navigation command, and the navigation behavior is navigation corresponding to the navigation command.

In Example 16, the unmanned aerial vehicle navigation system of Example 15 is disclosed, wherein the navigation command causes the unmanned aerial vehicle to ascend, descend, turn left, turn right, rotate left, or rotate right.

In Example 17, the unmanned aerial vehicle navigation system of any one of Examples 1 through 16 is disclosed, wherein the one or more processors are configured to receive image data from a plurality of cameras; display received image data from a first camera as a primary image feed; and display received image data from one or more additional cameras as a secondary image feed.

In Example 18, the unmanned aerial vehicle navigation system of Example 3 or 5 is disclosed, wherein the one or more processors are configured to enter an inspection mode upon reaching a vicinity of the object, the inspection mode comprising maintaining a minimum safe distance from the object.

In Example 19, the unmanned aerial vehicle navigation system of Example 18 is disclosed, wherein the one or more processors determine a navigation instruction to cause the unmanned aerial vehicle to maintain a position, such that an axis between the unmanned aerial vehicle and the object is normal to the object.

In Example 20, the unmanned aerial vehicle navigation system of Example 18 or 19 is disclosed, further comprising the one or more sensors determining and causing the unmanned aerial vehicle to maintain a minimum safe distance from the navigation destination.

In Example 21, the unmanned aerial vehicle navigation system of any one of Examples 1 through 20 is disclosed, wherein a dimension of the mapped display region is limited to a predetermined maximum dimension.

In Example 22, the unmanned aerial vehicle navigation system of any one of Examples 1 to 20 is disclosed, wherein the display is a monitor.

In Example 23, the unmanned aerial vehicle navigation system of any one of Examples 1 to 20 is disclosed, wherein the display is a head mounted display.

In Example 24, the unmanned aerial vehicle navigation system of any one of Examples 1 to 20 is disclosed, wherein the display is augmented reality glasses.

In Example 25, a method of navigating an unmanned aerial vehicle is disclosed comprising detecting user image data; determining from the user image data a user eye orientation; selecting according to a selection criterion a navigation behavior based on the user eye orientation; and determining a navigation instruction to cause the unmanned aerial vehicle to travel in accordance with the navigation behavior.

In Example 26, the method of navigating an unmanned aerial vehicle of Example 25 is disclosed, further comprising displaying image data received from the unmanned aerial vehicle, and mapping the user eye orientation to a region of a user display.

In Example 27, the method of navigating an unmanned aerial vehicle of Example 26 is disclosed, further comprising selecting the navigation instruction based on a relationship between a location of the unmanned aerial vehicle and an object is disclosed, wherein the object corresponds to the mapped display region, and the navigation behavior is navigation toward the object.

In Example 28, the method of navigating an unmanned aerial vehicle of Example 27 is disclosed, further comprising selecting a navigation instruction based on a relationship between a location of the unmanned aerial vehicle and a navigational direction is disclosed, wherein the navigational direction corresponds to the mapped display region, and the navigation behavior is navigation in the navigational direction.

In Example 29, the method of navigating an unmanned aerial vehicle of any one of Examples 25 to 28 is disclosed, wherein the selection criterion is a sustained user eye orientation toward an object for at least a predetermined duration.

In Example 30, the method of navigating an unmanned aerial vehicle of any one of Examples 25 to 28 is disclosed, wherein the selection criterion is a sustained user eye orientation toward a location for at least a predetermined duration.

In Example 31, the method of navigating an unmanned aerial vehicle of any one of Examples 26 to 28 is disclosed, wherein the selection criterion is a sustained eye orientation toward a display region for at least a predetermined duration.

In Example 32, the method of navigating an unmanned aerial vehicle of any one of Examples 26 to 28 is disclosed, wherein the selection criterion is a non-ocular election of the mapped display region as an unmanned aerial vehicle destination.

In Example 33, the method of navigating an unmanned aerial vehicle of Example 32 is disclosed, wherein the non-ocular election is election using a button, slide, touchpad, or pedal.

In Example 34, the method of navigating an unmanned aerial vehicle of Example 32 is disclosed, wherein the non-ocular election is election using a hand-actuated control.

In Example 35, the method of navigating an unmanned aerial vehicle of Example 32 is disclosed, wherein the non-ocular election is election using a foot-actuated control.

In Example 36, the method of navigating an unmanned aerial vehicle of any one of Examples 25 through 35 is disclosed, further comprising determining a user attention state using one or more mapped eye orientations.

In Example 37, the method of navigating an unmanned aerial vehicle of Example 36 is disclosed, further comprising displaying a visual attention cue when the user attention state falls beneath a predetermined threshold.

In Example 38, the method of navigating an unmanned aerial vehicle of Example 36 is disclosed, further comprising playing an audio attention cue when the user attention state falls beneath a predetermined threshold.

In Example 39, the method of navigating an unmanned aerial vehicle of any one of Examples 25 through 38 is disclosed, wherein the mapped display region corresponds to a navigation command, and the navigation behavior is navigation corresponding to the navigation command.

In Example 40, the method of navigating an unmanned aerial vehicle of Example 39 is disclosed, wherein the navigation command causes the unmanned aerial vehicle to ascend, descend, turn left, turn right, rotate left, or rotate right.

In Example 41, the method of navigating an unmanned aerial vehicle of any one of Examples 25 through 40 is disclosed, further comprising receiving image data from a plurality of cameras; displaying received image data from a first camera as a primary image feed; and displaying received image data from one or more additional cameras as a secondary image feed.

In Example 42, the method of navigating an unmanned aerial vehicle of Example 27 or 29 is disclosed, further comprising entering an inspection mode upon reaching a vicinity of the object, the inspection mode comprising maintaining a minimum safe distance from the object.

In Example 43, the method of navigating an unmanned aerial vehicle of Example 42 is disclosed, further comprising determining a navigation instruction to cause the unmanned aerial vehicle to maintain a position, such that an axis between the unmanned aerial vehicle and the object is normal to the object.

In Example 44, the method of navigating an unmanned aerial vehicle of Example 42 or 43 is disclosed, further comprising determining a minimum safe distance from the object and maintaining a minimum safe distance from the object.

In Example 45, the method of navigating an unmanned aerial vehicle of any one of Examples 25 through 44 is disclosed, wherein a dimension of the mapped display region is limited to a predetermined maximum dimension.

In Example 46, the method of navigating an unmanned aerial vehicle of any one of Examples 25 to 45 is disclosed, wherein the display is a monitor.

In Example 47, the method of navigating an unmanned aerial vehicle of any one of Examples 25 to 45 is disclosed, wherein the display is a head mounted display.

In Example 48, the method of navigating an unmanned aerial vehicle of any one of Examples 25 to 45 is disclosed, wherein the display is augmented reality glasses.

In Example 49, a means for unmanned aerial vehicle navigation is disclosed comprising one or more image receiving means for detecting user image data; and one or more processing means for determining from the user image data a user eye orientation; selecting according to a selection criterion a navigation behavior based on the user eye orientation; and determining a navigation instruction to cause the unmanned aerial vehicle to travel in accordance with the navigation behavior.

In Example 50, the means for unmanned aerial vehicle navigation of Example 49 is disclosed, further comprising a displaying means for displaying image data received from the unmanned aerial vehicle is disclosed, wherein the one or more processing means map the user eye orientation to a region of the display.

In Example 51, the means for unmanned aerial vehicle navigation of Example 50 is disclosed, wherein the mapped display region corresponds to an object; the navigation behavior is navigation toward the object; and the navigation instruction is selected based on a relationship between a location of the unmanned aerial vehicle and the object.

In Example 52, the means for unmanned aerial vehicle navigation of Example 50 is disclosed, wherein the mapped display region corresponds to a navigational direction; the navigation behavior is navigation in the navigational direction; and a navigation instruction is selected based on a relationship between a location of the unmanned aerial vehicle and the navigational direction.

In Example 53, the means for unmanned aerial vehicle navigation of any one of Examples 49 to 52 is disclosed, wherein the selection criterion is a sustained user eye orientation toward an object for at least a predetermined duration.

In Example 54, the means for unmanned aerial vehicle navigation of any one of Examples 49 to 52 is disclosed, wherein the selection criterion is a sustained user eye orientation toward a location for at least a predetermined duration.

In Example 55, the means for unmanned aerial vehicle navigation of any one of Examples 49 to 52 is disclosed, wherein the selection criterion is a sustained eye orientation toward a display region for at least a predetermined duration.

In Example 56, the means for unmanned aerial vehicle navigation of any one of Examples 49 to 52 is disclosed, wherein the selection criterion is a non-ocular election of the mapped display region as an unmanned aerial vehicle destination.

In Example 57, the means for unmanned aerial vehicle navigation of Example 56 is disclosed, wherein the non-ocular election is election using a button, slide, touchpad, or pedal.

In Example 58, the means for unmanned aerial vehicle navigation of Example 56 is disclosed, wherein the non-ocular election is election using a hand-actuated control.

In Example 59, the means for unmanned aerial vehicle navigation of Example 56 is disclosed, wherein the non-ocular election is election using a foot-actuated control.

In Example 60, the means for unmanned aerial vehicle navigation of any one of Examples 49 through 59 is disclosed, wherein the one or more processing means are further for determining a user attention state using one or more mapped eye orientations.

In Example 61, the means for unmanned aerial vehicle navigation of Example 60 is disclosed, wherein the one or more processing means are further for displaying a visual attention cue.

In Example 62, the means for unmanned aerial vehicle navigation of Example 60 is disclosed, wherein the one or more processing means are further for playing an audio attention cue.

In Example 63, the means for unmanned aerial vehicle navigation of any one of Examples 49 through 62 is disclosed, wherein the mapped display region corresponds to a navigation command, and the navigation behavior is navigation corresponding to the navigation command.

In Example 64, the means for unmanned aerial vehicle navigation of Example 63 is disclosed, wherein the navigation command causes the unmanned aerial vehicle to ascend, descend, turn left, turn right, rotate left, or rotate right.

In Example 65, the means for unmanned aerial vehicle navigation of any one of Examples 49 through 64 is disclosed, wherein the one or more processing means are further for receiving image data from a plurality of cameras; displaying received image data from a first camera as a primary image feed; and displaying received image data from one or more additional cameras as a secondary image feed.

In Example 66, the means for unmanned aerial vehicle navigation of Example 51 or 53 wherein the one or more processing means are further for entering an inspection mode upon reaching a vicinity of the object, the inspection mode comprising maintaining a minimum safe distance from the object.

In Example 67, the means for unmanned aerial vehicle navigation of Example 66 is disclosed, wherein the one or more processing means are further for determining a navigation instruction to cause the unmanned aerial vehicle to maintain a position, such that an axis between the unmanned aerial vehicle and the object is normal to the object.

In Example 68, the means for unmanned aerial vehicle navigation of Example 66 or 67 is disclosed, wherein the one or more image receiving means are further for determining and causing the unmanned aerial vehicle to maintain a minimum safe distance from the navigation destination.

In Example 69, the means for unmanned aerial vehicle navigation of any one of Examples 49 through 68 is disclosed, wherein a dimension of the mapped display region is limited to a predetermined maximum dimension.

In Example 70, the means for unmanned aerial vehicle navigation of any one of Examples 49 to 68 is disclosed, wherein the displaying means is a monitor.

In Example 71, the means for unmanned aerial vehicle navigation of any one of Examples 49 to 68 is disclosed, wherein the displaying means is a head mounted display.

In Example 72, the means for unmanned aerial vehicle navigation of any one of Examples 49 to 68 is disclosed, wherein the displaying means is augmented reality glasses.

In Example 73, a non-transitory computer readable medium is disclosed containing program instructions for causing a computer to perform the method of:
detecting user image data; determine from the user image data a user eye orientation;
selecting according to a selection criterion a navigation behavior based on the user eye orientation; and determining a navigation instruction to cause the unmanned aerial vehicle to travel in accordance with the navigation behavior.

In Example 74, a non-transitory computer readable medium is disclosed containing program instructions for causing a computer to perform any method in Examples 25-48.

In Example 75, the unmanned aerial navigation system of any one of Examples 1-24 is disclosed, further comprising a transceiver, configured to transmit the navigation instruction to an unmanned aerial vehicle.

In Example 76, the method of navigating an unmanned aerial vehicle of any one of Examples 25 to 48 is disclosed, further comprising transmitting a navigation instruction to an unmanned aerial vehicle.

In Example 77, the means for unmanned aerial vehicle navigation of any one of Examples 49 to 72 is disclosed, further comprising a transmitting means for transmitting the navigation instruction to an unmanned aerial vehicle.

What is claimed is:

1. An unmanned aerial vehicle navigation system comprising:
   a display, configured to display image data received from an unmanned aerial vehicle;
   one or more cameras configured to detect ocular image data; and
   one or more processors configured to
      determine from the ocular image data a user eye orientation;
      select a navigation behavior based on the user eye orientation on the unmanned aerial vehicle image data according to a selection criterion; and
      determine a navigation instruction to cause the unmanned aerial vehicle to travel in accordance with the navigation behavior.

2. The unmanned aerial vehicle navigation system of claim 1, wherein the one or more processors map the user eye orientation to a region of the display.

3. The unmanned aerial vehicle navigation system of claim 2, wherein the mapped display region corresponds to an object; the navigation behavior is navigation toward the object; and the navigation instruction is selected based on a relationship between a location of the unmanned aerial vehicle and the object.

4. The unmanned aerial vehicle navigation system of claim 2, wherein the mapped display region corresponds to a navigational direction; the navigation behavior is navigation in the navigational direction; and a navigation instruction is selected based on a relationship between a location of the unmanned aerial vehicle and the navigational direction.

5. The unmanned aerial vehicle navigation system of claim 1, wherein the selection criterion is a sustained user eye orientation toward an object for at least a predetermined duration.

6. The unmanned aerial vehicle navigation system of claim 1, wherein the selection criterion is a sustained user eye orientation toward a location for at least a predetermined duration.

7. The unmanned aerial vehicle navigation system of claim 1, wherein the selection criterion is a sustained eye orientation toward a display region for at least a predetermined duration.

8. The unmanned aerial vehicle navigation system of claim 2, wherein the selection criterion additionally includes a non-ocular election of the mapped display region as an unmanned aerial vehicle destination.

9. The unmanned aerial vehicle navigation system of claim 2, wherein the mapped display region corresponds to a navigation command, and the navigation behavior is navigation corresponding to the navigation command.

10. The unmanned aerial vehicle navigation system of claim 9, wherein the navigation command causes the unmanned aerial vehicle to ascend, descend, turn left, turn right, rotate left, rotate right, or return home.

11. A method of navigating an unmanned aerial vehicle comprising:
    detecting ocular image data;
    displaying image data received from an unmanned aerial vehicle;
    determining from the ocular image data a user eye orientation;
    selecting a navigation behavior based on the user eye orientation on the unmanned aerial vehicle image data according to a selection criterion; and
    determining a navigation instruction to cause the unmanned aerial vehicle to travel in accordance with the navigation behavior.

12. The method of navigating an unmanned aerial vehicle of claim 11, further comprising mapping the user eye orientation to a region of a user display.

13. The method of navigating an unmanned aerial vehicle of claim 12, further comprising selecting the navigation instruction based on a relationship between a location of the unmanned aerial vehicle and an object, wherein the object corresponds to the mapped display region, and the navigation behavior is navigation toward the object.

14. The method of navigating an unmanned aerial vehicle of claim 12, further comprising selecting a navigation instruction based on a relationship between a location of the unmanned aerial vehicle and a navigational direction, wherein the navigational direction corresponds to the mapped display region, and the navigation behavior is navigation in the navigational direction.

15. The method of navigating an unmanned aerial vehicle of claim 11, wherein the selection criterion is a sustained user eye orientation toward an object for at least a predetermined duration.

16. The method of navigating an unmanned aerial vehicle of claim 11, wherein the selection criterion is a sustained user eye orientation toward a location for at least a predetermined duration.

17. The method of navigating an unmanned aerial vehicle of claim 11, wherein the selection criterion is a sustained eye orientation toward a display region for at least a predetermined duration.

18. The method of navigating an unmanned aerial vehicle of claim 12, wherein the selection criterion additionally includes a non-ocular election of the mapped display region as an unmanned aerial vehicle destination.

19. The method of navigating an unmanned aerial vehicle of claim 12, wherein the mapped display region corresponds to a navigation command, and the navigation behavior is navigation corresponding to the navigation command.

20. The method of navigating an unmanned aerial vehicle of claim 19, wherein the navigation command causes the unmanned aerial vehicle to ascend, descend, turn left, turn right, rotate left, rotate right or return home.

* * * * *